United States Patent [19]

Kim

[11] Patent Number: 5,894,834
[45] Date of Patent: Apr. 20, 1999

[54] COOLING SYSTEM FOR WATER COOLING TYPE ENGINE

[75] Inventor: Jung-Shik Kim, Kyungsangnam-do, Rep. of Korea

[73] Assignee: Hyundai Motor Company, Seoul, Rep. of Korea

[21] Appl. No.: 08/924,991

[22] Filed: Sep. 5, 1997

[30] Foreign Application Priority Data

Sep. 6, 1996 [KR] Rep. of Korea ............ 96-38673

[51] Int. Cl.$^6$ .................................................. F02G 5/00

[52] U.S. Cl. ............... 123/552; 123/41.29; 237/12.3 B; 165/297

[58] Field of Search ................... 123/41.1, 41.29, 123/552; 237/12.3 B; 165/297, 299

[56] References Cited

U.S. PATENT DOCUMENTS 3,092,325  1/1963  Brown, Jr. et al. ............ 237/12.3 B
3,223,150  12/1965  Tramontini ...................... 237/12.3 B

*Primary Examiner*—Noah P. Kamen
*Attorney, Agent, or Firm*—Christie, Parker & Hale, LLP

[57] ABSTRACT

A cooling system for a water cooled engine provides increased heating capacity on cold starts and prevents icing of the throttle body. This is achieved by preheating the cooling water delivered to the throttle body and a heater core with a heating device. The heating device includes a first housing for passing the cooling water from the engine to the throttle body and the heater core, and a second housing disposed around the first housing to form an exhaust passage between the first and second housings. An exhaust gas control device selectively passes exhaust from the engine to the exhaust passage of the heating device to heat the cooling water. The exhaust from the engine is passed to the heating device as a function of when the cooling water temperature.

7 Claims, 2 Drawing Sheets

5,894,834

1

COOLING SYSTEM FOR WATER COOLING TYPE ENGINE

BACKGROUND OF THE INVENTION

The present invention relates to a cooling system for a water cooling type engine having both an improved heating characteristic upon starting a cold automobile engine and a function for preventing icing of a throttle body.

In general, the cooling system of a water cooling type engine is constructed, as shown in FIG. 3, to cool the engine 100 by circulating cooling water by means of a pumping operation of a water pump 104 mounted to the inlet side of a water jacket 103 formed with a cylinder block 101 and a cylinder head 102 of an engine 100. Since the cooling water circulating in the water jacket 103 is not heated to a predetermined temperature (approximately 80° C.) when initially starting the engine, a thermostat 106 in a water temperature controlling device 105 induces the flow of cooling water to a throttle body 107 and a heater core 108 so as to preheat the throttle body and the heater core. After a predetermined time elapses from the starting of the engine, the cooling water becomes heated to the predetermined temperature, and the thermostat 106 causes the cooling water to flow to a radiator 109 so that the heated cooling water is cooled by a heat exchanging operation and recirculated to the engine.

However, with the conventional technique, since the preheating of the throttle body and heater core depends on the heat source of the cooling water, the preheating effect, when the engine is cold, cannot be achieved because the cooling water is not heated. Since the throttle body is not preheated when the engine is started, cold air is supplied to the engine, which causes deterioration of combustion efficiency and lowers the heating characteristic. These problems are greatest in severe cold seasons.

SUMMARY OF THE INVENTION

An embodiment of the present invention overcomes the problems associated with conventional technique by providing a cooling system which improves the heating capacity when starting a cold engine in severe cold seasons together with improving the combustion efficiency. This is achieved by preventing icing of the throttle body by preheating the throttle body and heater core with a heat source such as high temperature exhaust gas discharged from the engine which does not depend on the heat source of cooling water.

According to one embodiment of the present invention, a heating device delivers cooling water to a throttle body and a heater core. The heating device includes a first housing for passing the cooling water therethrough, and a second housing disposed around the first housing to form an exhaust passage between the first and second housings. Preferably, the first housing is formed in a helical shape. A water temperature detecting sensor is used to detect the cooling water temperature. An exhaust gas control device is used to selectively pass exhaust from the engine to the exhaust passage of the heating device as a function of the cooling water temperature.

In one embodiment of the cooling system, an electronic control unit (ECU), responsive to the cooling water temperature, controls a switching valve in the exhaust gas control device for selectively passing the exhaust to the exhaust passage of the heating device through a solenoid valve.

In an alternative embodiment, the water cooling system includes a water pump at the inlet side of a water jacket of

2 a cylinder head, and a water temperature control device mounted with a thermostat at the outlet side of the engine. A first cooling water supply line is used to provide coolant water to the throttle body and the heater core. A second cooling water supply line is connected between a radiator and the water temperature control device. A first cooling water recovery line and a second cooling water recovery line from the water pump are connected, respectively, to a throttle body and the heater core. A third cooling water recovery line is connected between the water pump and the radiator. A catalyst and a muffler are provided on an exhaust line of a discharge manifold mounted to the opposite side of a suction manifold of the cylinder.

A water temperature detecting sensor detects the water temperature of the cooling water flowing into the water temperature control device and sends a signal to the ECU.

The heating device is formed with a first housing having a first discharge line and a second discharge line which are connected to the first cooling water supply line to supply cooling water to the throttle body and the heater core.

The exhaust gas flow control device has a switching valve used to switch the flow of exhaust gas from the engine between the heating device and the exhaust line.

A solenoid valve is provided in a bypass line connected between the exhaust gas flow control device and the heating device. The opening and closing of the solenoid valve is controlled by the ECU.

The heating device includes a second housing which is disposed around the first housing to form an exhaust passage. The second housing includes an inlet connected with the bypass line and an outlet connected with a discharge line for discharging the exhaust gas to the exhaust line.

The heating device provides heating of the cooling water passing through the first housing by utilizing exhaust gas passing through the exhaust passage of the heating device.

DETAILED DESCRIPTION OF THE PREFERRED EMBODIMENTS

Figure 1:
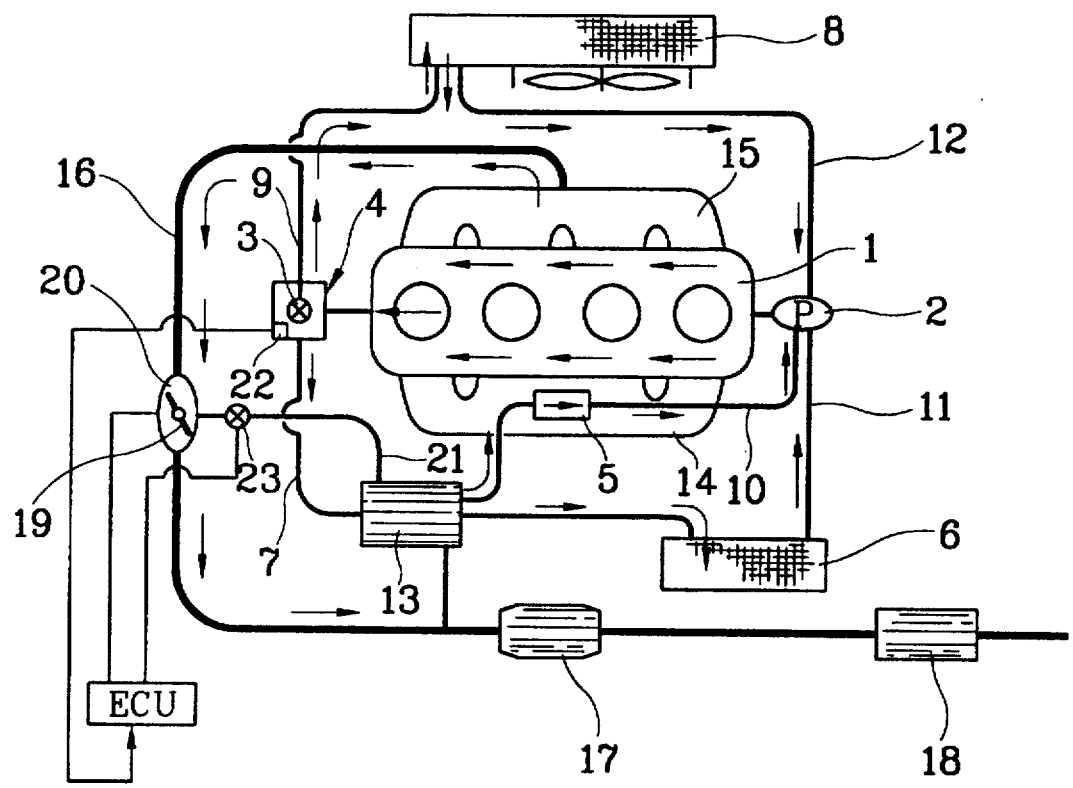
FIG. 1 is a systematic view of a cooling system in accordance with a preferred embodiment of the present invention.
Figure 2:
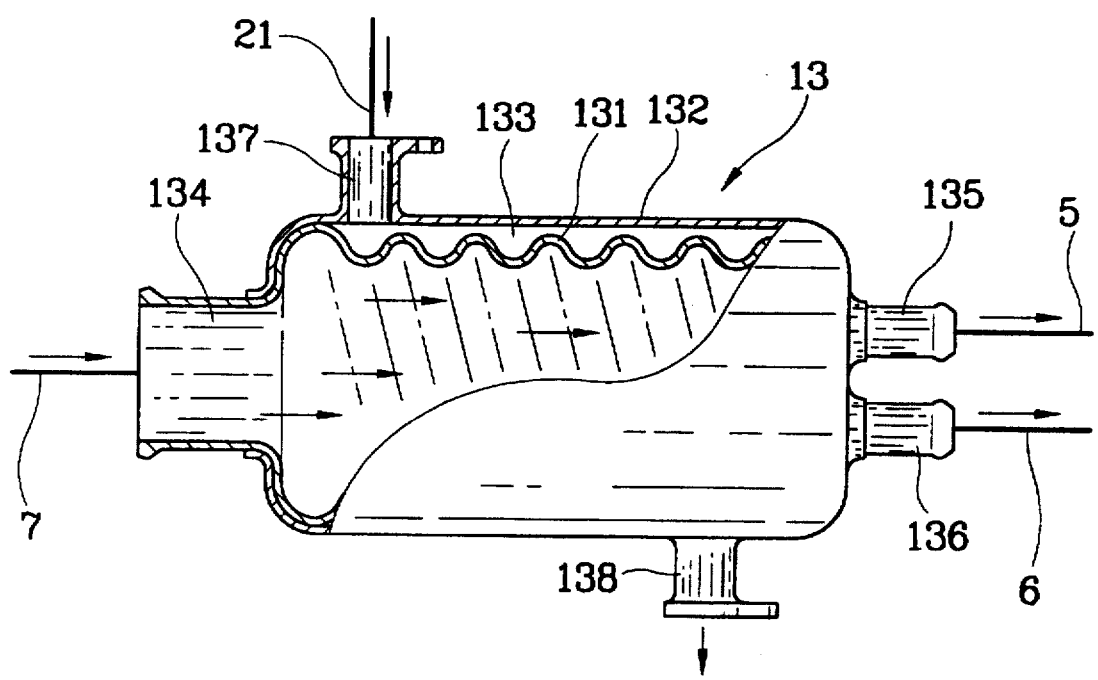
FIG. 2 is a detailed cross-sectional view of a heating device in accordance with a preferred embodiment of the present invention.
Figure 3:
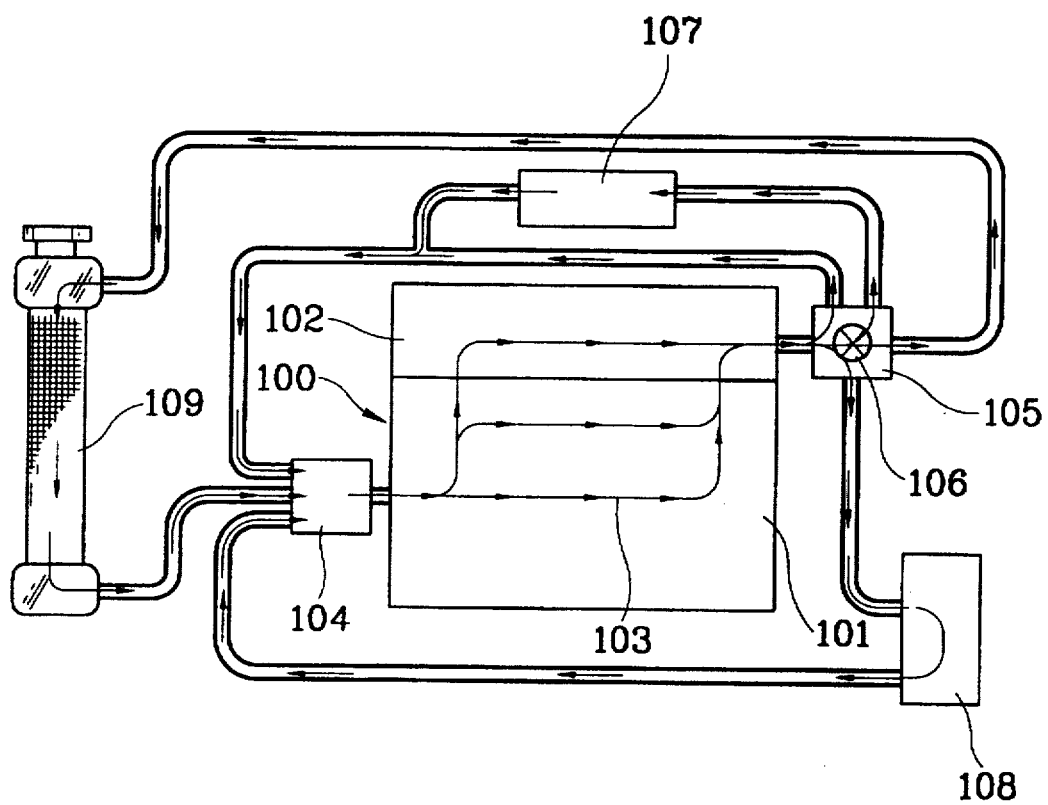
FIG. 3 is a schematic view of a cooling system of a conventional technique.

FIG. 1 shows a schematic diagram of a cooling system of an embodiment of the present invention with a heating device 13. A detailed cross-sectional view of the heating device is shown in FIG. 2. The cooling system includes a cylinder head 1 assembled with a cylinder block 15 formed with a water jacket, a water temperature control device 4, a water pump 2 at the inlet side of the cylinder head 1 and a thermostat 3 at the outlet side of the cylinder head 1.

The water temperature control device 4 is provided with a first cooling water supply line 7 for supplying cooling water to a throttle body 5 and heater core 6, and second cooling water supply line 9 for circulating the cooling water to a radiator 8. The throttle body 5 and the heater core 6 are connected to the water pump 2, respectively, through first and second recover lines 10, 11. A third cooling water recover line 12 of the radiator 8 is also connected to the water pump 2.

The heating device 13 is constructed with a first housing 131 and second housing 132. The second housing 132 of the heating device 13 surrounds the first housing 131, and is assembled and formed with an exhaust passage 133.

A flowing inlet 134 connected with the first cooling water supply line 7, and flowing outlets 135, 136 connected to the throttle body 5 and to the heater core 6, are provided to the first housing 131. A flowing inlet 137 and a flowing outlet 138, for exhaust gas flow, are provided to the second housing 132.

A suction manifold 14 supplies air to the cylinder head 1. An exhaust manifold 15 discharges the exhaust gas. A catalyst 17 and a muffler 18 are connected to an exhaust line 16 of the exhaust manifold 15, and an exhaust gas flow device 20, provided with switching valve 19, is connected between the exhaust manifold 15 and the catalyst 17 to supply the exhaust gas to the second housing 132 of the heating device 13 through a bypass line 21.

A water temperature detecting sensor 22 for detecting the temperature of the cooling water upon starting a cold engine provides a water temperature signal to an ECU connected to the water temperature control device 4. The ECU controls the exhaust gas flow control device 20 connected to the exhaust line 16 and a solenoid valve 23 connected to the bypass line 21.

In operation, the cooling water is not heated when the engine is started. The water temperature of the cooling water circulated to the outlet of the cylinder head 1 by the water pump 2 is detected causing the valve of the thermostat 3 to open to the first cooling water supply line 7. This allows the cooling water to circulate through the first cooling water supply line 7 and the first housing 131 of the heating device 13. When the water temperature detecting sensor 22 detects the temperature of the cooling water circulated through the first cooling water supply line 7, a water temperature signal is sent to the ECU causing the ECU to send an output signal to the exhaust gas flow control device 2 and the solenoid valve 23. The ECU signal operates the switching valve 19 to cause exhaust gas flow into the bypass line 21 and at the same time, the solenoid valve 23 opens (FIG. 1), so that the high temperature exhaust gas discharged from the exhaust manifold 15 flows into the second housing 132 of the heating device 23 through the bypass line 21 to heat the first housing 131 before being discharged from the discharge outlet 138 through the exhaust passage 133.

The first housing 131 has a helical form which improves the heating effect of the first housing 131 when exhaust gas flows through the exhaust passage 133. The helical first housing delays the exhaust gas flow. Additionally, the contacting surface area between the cooling water passing through the inside and outside of the first housing and the exhaust gas is broadened resulting in quicker heating of the cooling water.

Accordingly, the cooling water passing through the first housing 131, via the thermostat 3, upon starting the cold engine is heated by the high temperature of the exhaust gas flowing through the helical shaped exhaust passage 133. The heated cooling water passes through the throttle body 5 and the heater core 6 and then is circulated to the water pump 5 through the first and second cooling water recovering lines 10, 11. As a result, the throttle body 5 supplies preheated air to the combustion chamber whereby combustion efficiency is increased, and the heating efficiency of the heater core 6 is improved.

Once the cooling water circulating through cylinder head 1 reaches a predetermined temperature, the thermostat 3 causes the cooling water to flow to the second cooling water supply line 9. The ECU receives a water temperature signal from the water temperature detecting sensor 22 causing the switching valve 19 of the exhaust gas flow control device 20 to close the bypass line 21 and at the same time cause the solenoid valve 23 to close so that the exhaust gas discharged from the exhaust manifold 15 flows to the catalyst 17 through the exhaust line 16 diverting the cooling water and the exhaust gas from flowing to the heating device 13.

In accordance with a preferred embodiment, the present invention, when initially starting a cold engine, there is a reduction in the warming up time of the engine by making the cooling water circulate through the cylinder block and the cylinder head to rise to a predetermined temperature more rapidly by circulating the cooling water through the heating device and at the same time making the high temperature exhaust gas discharged from the exhaust manifold to heat the heating device before discharge. The heated cooling water from the heating device preheats the throttle body and the heater core, improving combustion efficiency and heating characteristics which can improve the general capacity of an engine and minimize engine trouble immediately after the initial time of starting.

What is claimed is:

1. A cooling system for a water cooled engine, comprising:

a throttle body;

a heating device for delivering cooling water to the throttle body, said heating device comprising a first housing for passing the cooling water therethrough, and a second housing disposed around the first housing to form an exhaust passage between the first and second housings;

a water temperature detecting sensor for detecting a temperature of the cooling water; and an exhaust gas control device for selectively passing exhaust from the engine to the exhaust passage of the heating device, the selective passing of exhaust being a function of the detected cooling water temperature.

2. The cooling system of claim 1 further comprising an electronic control unit (ECU), and wherein said exhaust gas control device comprises a switching valve, controlled by the ECU, for selectively passing the exhaust to the exhaust passage of the heating device, said ECU being responsive to the detected cooling water temperature.

3. The cooling system of claim 2 further comprising a solenoid valve disposed between the exhaust gas control device and the heating device, said solenoid valve being controlled by the ECU to selectively pass the exhaust from the exhaust gas control device to the exhaust passage of the heating device.

4. The cooling system of claim 1 wherein the first housing is formed in a helical shape.

5. The cooling system of claim 1 further comprising:

a water pump for delivering the cooling water to an inlet of the engine;

a radiator for recirculating the cooling water from the engine to the water pump; and a water temperature control device for receiving the cooling water at an outlet of the engine, said water temperature control device having a thermostat for switching the flow of the cooling water between the radiator and the heating device, the cooling water delivered to the throttle body through the heating device being recirculated to the water pump.

6. The cooling system of claim 5 further comprising an exhaust line having a catalyst and a muffler, and wherein said exhaust gas control device comprises a switching valve for switching the exhaust from the engine between the exhaust passage of the heating device and the exhaust line, said heating device having an inlet for receiving the exhaust from the exhaust gas control device and an outlet for discharging the exhaust to the exhaust line.

7. The cooling system of claim 1 further comprising a heater core connected to the heating device.

* * * * *